(12) United States Patent  (10) Patent No.: US 9,189,675 B2
Kim  (45) Date of Patent: Nov. 17, 2015

(54) ADAPTIVE FINGERPRINT SCANNING

(76) Inventor: Moon J. Kim, Wappingers Falls, NY (US)

( * ) Notice: Subject to any disclaimer, the term of this patent is extended or adjusted under 35 U.S.C. 154(b) by 666 days.

(21) Appl. No.: 13/096,179

(22) Filed: Apr. 28, 2011

(65) Prior Publication Data

US 2012/0275669 A1  Nov. 1, 2012

(51) Int. Cl.
   *G06K 9/00*  (2006.01)
(52) U.S. Cl.
   CPC .................... *G06K 9/0002* (2013.01)
(58) Field of Classification Search
   USPC ............... 382/124–127; 235/454, 492
   See application file for complete search history.

(56) References Cited

U.S. PATENT DOCUMENTS

| | | | |
|---|---|---|---|
| 4,429,413 A | | 1/1984 | Edwards |
| 5,864,296 A | | 1/1999 | Upton |
| 5,907,627 A | | 5/1999 | Borza |
| 5,940,525 A | * | 8/1999 | Itsumi ........................ 382/124 |
| 6,097,035 A | | 8/2000 | Belongie et al. |
| 6,114,862 A | | 9/2000 | Tartagni et al. |
| 6,125,192 A | | 9/2000 | Bjorn et al. |
| 6,161,157 A | | 12/2000 | Tripathi et al. |
| 6,317,508 B1 | | 11/2001 | Kramer et al. |
| 6,360,953 B1 | | 3/2002 | Lin et al. |
| 6,414,297 B1 | | 7/2002 | Sasaki et al. |
| 6,512,381 B2 | | 1/2003 | Kramer |
| 6,580,816 B2 | | 6/2003 | Kramer et al. |
| 6,633,656 B1 | | 10/2003 | Picard |
| 6,643,389 B1 | | 11/2003 | Raynal et al. |
| 6,681,992 B2 | * | 1/2004 | Iihama ........................ 235/454 |
| 6,686,546 B2 | | 2/2004 | Chiu |
| 6,741,729 B2 | | 5/2004 | Bjorn et al. |

(Continued)

FOREIGN PATENT DOCUMENTS

| JP | 2006092428 A | * | 4/2006 |
|---|---|---|---|
| KR | 1020050025690 A | | 3/2005 |

OTHER PUBLICATIONS

"Fast TCP/IP Fingerpring Reader", CardPOS Europe Blog, Feb. 18, 2011, 1 page.

(Continued)

*Primary Examiner* — Soo Park
(74) *Attorney, Agent, or Firm* — Madeline F. Schiesser; Keohane & D'Alessandro PLLC

(57) ABSTRACT

Embodiments of the present invention provide an adaptive and intelligent fingerprint scanning device and approach. Specifically, embodiments of the present invention utilize DC resistive image scanning to reduce overall scanning time and energy consumption (e.g., by identifying a targeted scanning area). In a typical embodiment, a scanning device will be provided that includes a scanning area comprised of a set (e.g., at least one) of imaging pixel electrodes (e.g., arranged adjacent to one another in a grid-like or other fashion). As a user presses his/her finger against the scanning area, a first portion of the finger will contact a first electrode while a second portion of the finger will contact a second electrode. When this occurs, a voltage source of the device will apply an initial voltage across the first and second finger portions. A meter of the device will take an electrical measurement (e.g., resistance and/or charged skin voltage) across the two finger portions. Based on the electrical measurement, a location of the finger on the device will be identified, and the fingerprint will be scanned accordingly. Thus, the entire scanning surface need not be scanned, only the portions thereof where the finger was detected.

17 Claims, 10 Drawing Sheets

(56) References Cited

U.S. PATENT DOCUMENTS

| | | |
|---|---|---|
| 7,231,070 B2 | 6/2007 | Bjorn et al. |
| 7,519,204 B2 | 4/2009 | Bjorn et al. |
| 7,864,992 B2 | 1/2011 | Riedijk et al. |
| 7,961,917 B2 | 6/2011 | Black |
| 8,031,046 B2 | 10/2011 | Franza et al. |
| 8,144,115 B2 | 3/2012 | Konicek |
| 8,392,965 B2 | 3/2013 | Carter et al. |
| 2001/0008004 A1* | 7/2001 | Jarosz ........................ 711/1 |
| 2002/0064892 A1 | 5/2002 | Lepert et al. |
| 2002/0156593 A1* | 10/2002 | Hayes et al. ............... 702/127 |
| 2005/0163350 A1 | 7/2005 | Kim et al. |
| 2005/0204091 A1 | 9/2005 | Kilbuck et al. |
| 2005/0226478 A1 | 10/2005 | Fujiyoshi |
| 2006/0171230 A1 | 8/2006 | Bacchus et al. |
| 2008/0201661 A1 | 8/2008 | Haynes et al. |
| 2009/0055580 A1 | 2/2009 | Moscibroda et al. |
| 2009/0058598 A1 | 3/2009 | Sanchez et al. |
| 2009/0103934 A1* | 4/2009 | Murakami ..................... 399/45 |
| 2009/0150641 A1 | 6/2009 | Flynn et al. |
| 2009/0157993 A1 | 6/2009 | Garrett, Jr. |
| 2010/0113952 A1 | 5/2010 | Raguin et al. |

OTHER PUBLICATIONS

"Lights and stripes and the future of fingerprinting", Flashscan 3D, LLC, , 2010. 2 pages.

U.S. Appl. No. 13/159,504, Notice of Allowance dated Oct. 28, 2013, 28 pages.

U.S Appl. No. 14/215,314, Notice of Allowance dated Jul. 2, 2014, 22 pages.

U.S. Appl. No. 14/230,355, Office Action dated Oct. 31, 2014, 23 pages.

U.S. Appl. No. 14/230,355, Notice of Allowance dated May 26, 2015, 8 pages.

U.S. Appl. No. 13/106,928, Notice of Allowance dated Dec. 6, 2013, 15 pages.

U.S. Appl. No. 13/106,928, Office Action dated Jul. 17, 2013, 21 pages.

\* cited by examiner

ADAPTIVE FINGERPRINT SCANNING

FIELD OF THE INVENTION

In general, the present invention relates to fingerprint scanning. Specifically, the present invention relates to a device and method for reducing fingerprint scanning time and associated energy consumption.

BACKGROUND OF THE INVENTION

As global security concerns continue to grow, fingerprint scanning for identity verification is becoming an often used tool for identity verification. Existing fingerprint imaging methods are based on full image scanning, which is not only time consuming (especially when performed across a large sample size), but also energy inefficient. Heretofore, several unsuccessful attempts have been made to address these shortcomings.

U.S. Pat. Nos. 7,519,204, 7,231,078, 6,741,729, 6,125,192, and 6,097,035 disclose a method and apparatus for fingerprint recognition.

U.S. Pat. No. 6,512,381 discloses a fingerprint sensing circuit.

U.S. Pat. No. 5,864,296 discloses a fingerprint ridge, sensor-based detector.

U.S. Pat. No. 7,864,992 discloses a fingerprint sensor element that measures sensor point capacitance.

U.S. Pat. Nos. 6,643,389, 6,580,816, and 6,317,508 disclose a capacitive semiconductor array for fingerprint detection.

U.S. Pat. No. 6,633,656 discloses a fingerprint sensor comprised of an array of microthermistor devices which convert temperature conditions into electrical signals.

U.S. Pat. No. 6,414,297 discloses a fingerprint reading apparatus.

U.S. Pat. No. 4,429,413 discloses a fingerprint sensor for creating an electrical output signal based upon the topological pattern of a finger.

U.S. Patent Application 20050226478 discloses a fingerprint sensor that uses a capacitance detecting circuit.

U.S. Patent Application 20050163350 discloses a fingerprint sensing apparatus.

None of these references, however, teach a way to detect a targeted scanning area of a fingerprint so as to avoid wasted scanning time and unnecessary energy consumption by scanning an entire scanning area of a device.

SUMMARY OF THE INVENTION

In general, the embodiments of the present invention provide an adaptive and intelligent fingerprint scanning device and approach. Specifically, embodiments of the present invention utilize DC resistive image scanning to reduce overall scanning time and energy consumption (e.g., by identifying a targeted scanning area). In a typical embodiment, a scanning device will be provided that includes a scanning area comprised of a set (e.g., at least one) of imaging pixel electrodes (e.g., arranged adjacent to one another in a grid-like or other fashion). As a user presses his/her finger against the scanning area, a first portion of the finger will contact a first electrode while a second portion of the finger will contact a second electrode. When this occurs, a voltage source of the device will apply an initial voltage across the first and second finger portions. A meter of the device will take an electrical measurement (e.g., resistance and/or charged skin voltage) across the two finger portions. Based on the electrical measurement, a location of the finger on the device will be identified, and the fingerprint will be scanned accordingly. Thus, the entire scanning surface need not be scanned, only the portions thereof where the finger was detected.

A first aspect of the present invention provides a method of scanning fingerprints, comprising: applying an initial voltage to a first imaging pixel electrode, the first imaging pixel electrode being in contact with a first portion of a finger; and determining an electrical measurement across the first imaging pixel electrode and a second imaging pixel electrode in response to the applying of the initial voltage, the second imaging pixel electrode being in contact with the second portion of a finger.

A second aspect of the present invention provides a method of scanning fingerprints, comprising: applying an initial voltage to a first imaging pixel electrode, the first imaging pixel electrode being in contact with a first portion of a finger; and determining an electrical measurement across the first imaging pixel electrode and a second imaging pixel electrode in response to the applying of the initial voltage, the second imaging pixel electrode being in contact with the second portion of a finger, and the second imaging pixel electrode being non-adjacent to the first imaging pixel electrode; determining a location of a finger on a scanning device based on the electrical measurement; and scanning a fingerprint from the finger at the location.

A third aspect of the present invention provides a device for scanning fingerprints, comprising: a set of imaging pixel electrodes for creating a fingerprint scanning surface; a voltage source coupled to the set of imaging pixel electrodes for supplying an initial voltage; and a meter coupled to the set of imaging pixel electrodes for taking an electrical measurement across a first imaging pixel electrode and a second imaging pixel electrode of the set of imaging pixel electrodes.

A fourth aspect of the present invention provides an adaptive fingerprint scanning method, comprising: grouping a set of imaging pixel electrodes of a fingerprint scanning device into a plurality of groups; detecting a presence of a finger on at least one of the plurality of groups; and performing an adaptive fingering scanning of the at least one of the plurality of groups.

BRIEF DESCRIPTION OF THE DRAWINGS

These and other features of this invention will be more readily understood from the following detailed description of the various aspects of the invention taken in conjunction with the accompanying drawings in which.

Figure 1:
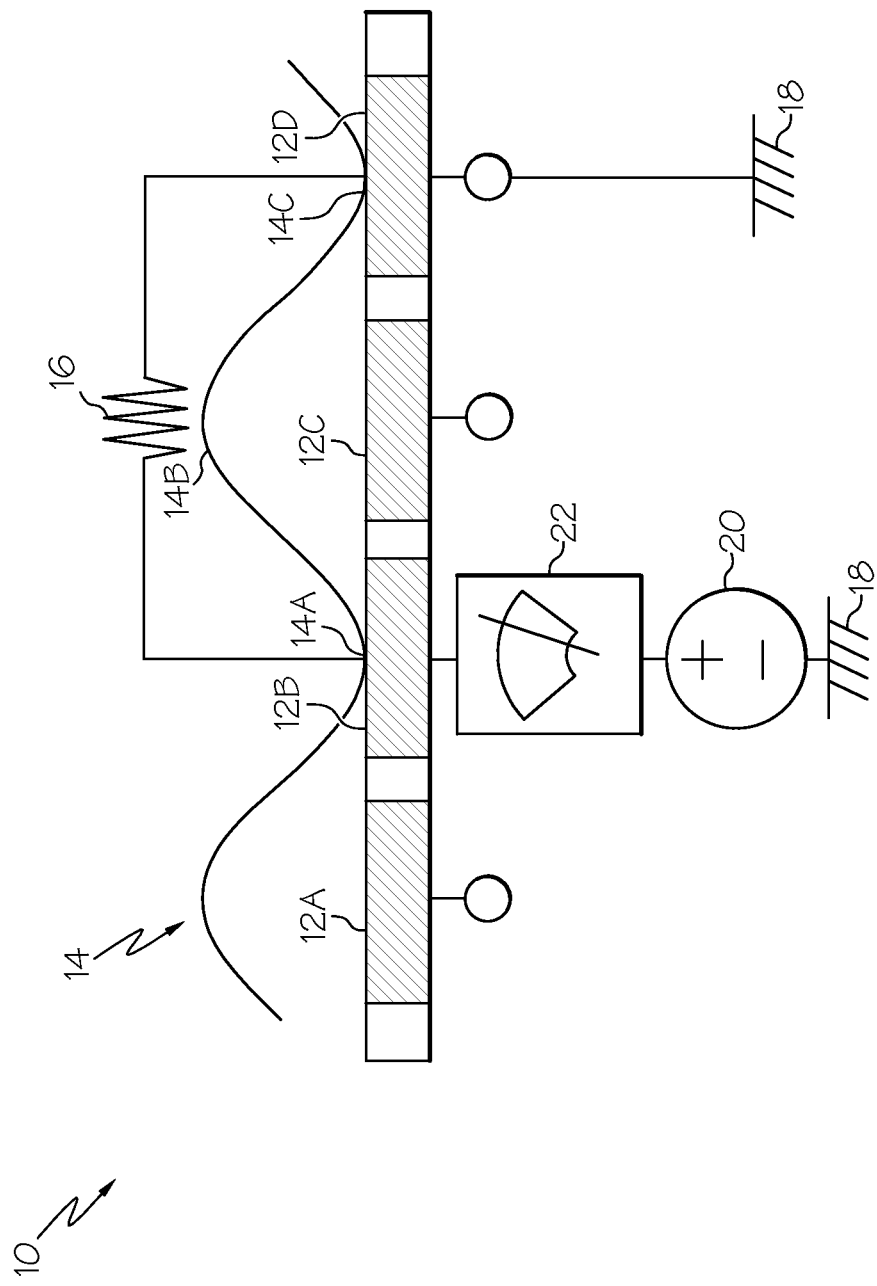
FIG. 1 depicts a fingerprint scanning device according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

A biometric finger scanner is a device that scans a fingerprint and keeps a record of it. For example, when a door is closed or a computer is shut down, a scanning device can be used to open the door or turn the device back on. A person whose fingerprint is stored as a valid access key is scanned when they put their finger on the scanning device. If it matches one of the "approved" fingerprints, access is granted.

The benefits of a biometric finger scanner revolve around the fact that it is nearly impossible to duplicate another person's fingerprint in a form that the scanner will recognize. Other types of access control solutions have a weakness in that they depend on something that can easily be lost, shared or duplicated. Another strength in fingerprint recognition is that, in the case of providing access through a door, whoever has an approved fingerprint does not necessarily have access to any other part of the security system. Anyone with the key to any door has access to a wealth of information: the manufacturer of the lock and possibly the model, the type of keys used at the facility, and, in the worst case scenario, possible access to a master-level key that can open more than one door.

In general, fingerprint scans convert people's fingerprints into digital codes or numerical data that can be recorded in a database. Like facial recognition software, fingerprint scanning matches an individual's code against an existing database of codes in order to confirm that individual's identity. Proponents of fingerprint scanning point to the conversion of fingerprints into digital data as a privacy protection measure. Since replicas of fingerprints themselves are never saved, but always converted, fingerprint data cannot be stolen or mishandled.

One issue surrounding the growing use of fingerprint scanning is the time required to scan multiple people, and the associated energy consumption. For example, previous approaches relied upon a scanning of an entire scanning area (e.g., a pad) even though a person's finger might only occupy a portion of the scanning area. Scanning an entire scanning area not only wastes time, but could also result in the scanning of unintentional anomalies.

As indicated above, embodiments of the present invention provide an adaptive and intelligent fingerprint scanning device and approach that provides targeted fingerprint scanning. Specifically, embodiments of the present invention utilize DC resistive image scanning to reduce overall scanning time and energy consumption (e.g., by identifying a targeted scanning area). In a typical embodiment, a scanning device will be provided that includes a scanning area comprised of a set (e.g., at least one) of imaging pixel electrodes (e.g., arranged adjacent to one another in a grid-like or other fashion). As a user presses his/her finger against the scanning area, a first portion of the finger will contact a first electrode while a second portion of the finger will contact a second electrode. When this occurs, a voltage source of the device will apply an initial voltage across the first and second finger portions. A meter of the device will take an electrical measurement (e.g., resistance and/or charged skin voltage) across the two finger portions. Based on the electrical measurement, a location of the finger on the device will be identified, and the fingerprint will be scanned accordingly. Thus, the entire scanning surface need not be scanned. Rather, only the portions thereof where the finger was first detected need be scanned.

Referring now to FIG. 1, a fingerprint scanning device 10 according to one embodiment of the present invention is shown. As depicted, device 10 comprises a set of imaging pixel electrodes/ports/sensors 12A-D for creating a scanning surface, a resister 16 coupled to imaging pixel electrodes 12B and 12D, a voltage source 20 and a meter 22 coupled to imaging pixel electrode 12B. Device 10 can further include a set of grounds 18.

In a typical embodiment, voltage source 20 will apply an initial voltage (e.g., a low-voltage DC bias) to imaging pixel electrode 12B. As shown, imaging pixel electrode 12B is in contact with a first portion 14A of a finger 14. Then, the resistance across finger portions 14A and 14C (e.g., across imaging pixel electrode 12B and imaging pixel electrode 12D) will be measured in response to the applying of the initial voltage. As further shown, imaging pixel electrode 12D is in contact with a second portion 14C of finger 14. It is not necessary for portions 14A and 14C to be contacting adjacent imaging pixel electrodes. In contrast, portions 14A-C can contact non-adjacent imaging pixel electrodes 12B and 12D as shown in FIG. 1. Regardless, the measurement of the resistance will allow the presence and location of finger 14 on a device 10 to be determined/detected (e.g., based on the measured resistance). Once determined, a fingerprint will be scanned from finger 14 at the detected location.

Figure 2:
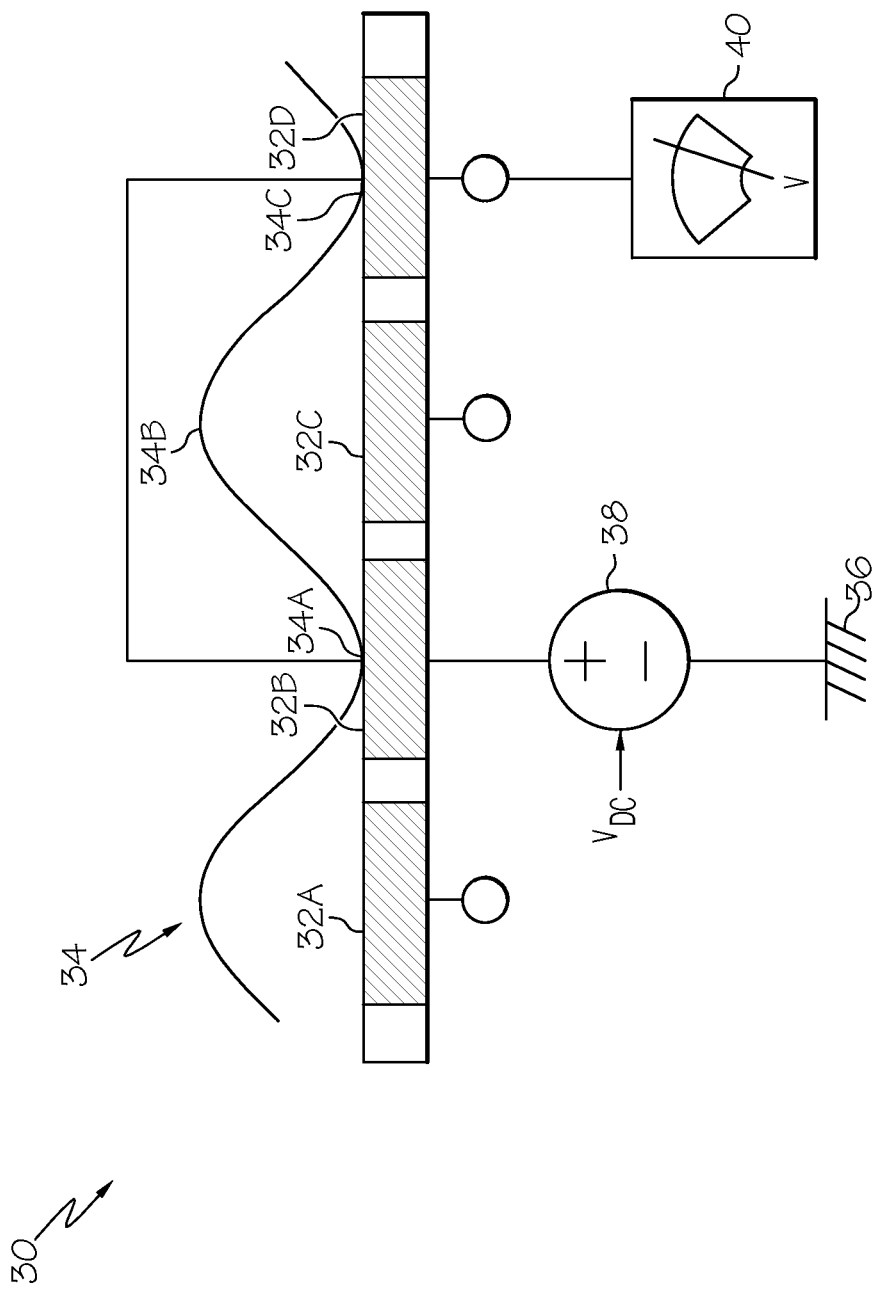
FIG. 2 depicts fingerprint scanning device according to another embodiment of the present invention.

Referring now to FIG. 2, a fingerprint scanning device 30 according to another embodiment of the present invention is shown. As depicted, device 30 comprises a set of imaging pixel electrodes/ports/sensors 32A-D for creating a scanning surface, a voltage source 38 coupled to imaging pixel electrode 32B and a meter 40 coupled to imaging pixel electrode 32D. Device 30 can further include a ground 36 coupled to imaging pixel electrode 32B and/or voltage source 38.

In a typical embodiment, voltage source 38 will apply an initial voltage (e.g., a low voltage DC bias) to imaging pixel electrode 32B. As shown, imaging pixel electrode 32B is in contact with a first portion 34A of a finger 34. Then, the charged skin voltage across finger portions 34A and 34C (e.g., across imaging pixel electrode 32B and imaging pixel electrode 32D) will be measured in response to the applying of the initial voltage. Specifically, as further shown, imaging pixel electrode 32B is in contact with a second portion 34C of finger 34. It is not necessary for portions 34A and 34C to be contacting adjacent imaging pixel electrodes. In contrast, portions 34A-C can contact non-adjacent imaging pixel electrodes 32B and 32D. Regardless, the measurement of the resistance will allow the presence and location of finger 34 on a device 30 to be determined/detected (e.g., based on the measured resistance). Once determined, a fingerprint will be scanned from finger 34 at the detected location.

Figure 3:
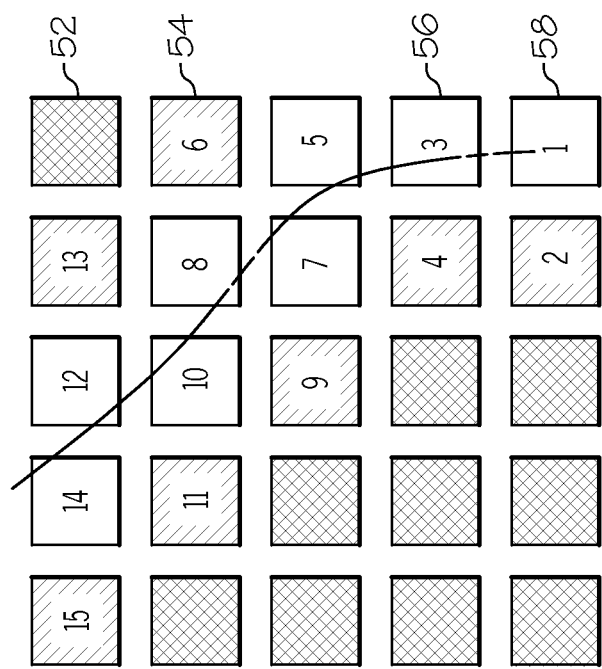
FIG. 3 depicts a scanning area for scanning a fingerprint according to an embodiment of the present invention.

Referring now to FIG. 3, these concepts are illustrated in conjunction with scanning area 50. In general, scanning area 50 comprises a matrix/array of imaging pixel electrodes/ports/sensors such as those shown in FIG. 1-2. In general, the approaches of FIG. 1 and/or FIG. 2 of taking an electrical measurement (e.g., resistance or charged skin voltage) allow for the identification of a targeted scanning area or location within scanning area 50 where a finger is actually present. As depicted, scanning area 50 comprises imaging pixel electrodes/zone 52 where no finger portion was detected, and imaging pixel electrodes/zone 56 (numbers 1, 3, 5, 7, 10, 12, and 14) where a finger portion was detected. Scanning area can also allow for a buffer zone between the zones such as imaging pixel electrodes/zone 54 (numbers 2, 4, 6, 8, 9, 11, 13, and 15), which may represent an area between two finger portions such as imaging pixel electrode 12C of FIG. 1 and/or imaging pixel electrode 32C of FIG. 2 (corresponding to finger portions 14B and 34B, respectively) where scanning may still be prudent. Voltage can be applied at any imaging pixel electrode such as imaging pixel electrode 58. In a typical embodiment, the voltage source remains at "1", and scanning moves through pixels, along the detected pattern. These embodiments reduce readout scanning time when there are limited data converter resources. In the example shown in FIG. 3, 15 of 25 imaging pixel electrodes (60%) are scanned, which thus reduces overall scanning time by 40%. That is, isolated imaging pixel electrodes can be ignored and not scanned. As such, the process provided by the embodiments of the present invention is adaptive and multi-step: (1) detect the presence of a finger; and scan a fingerprint from the finger using information obtained by the presence detection in an adaptive process. It is understood that in a typical embodiment, the imaging pixel electrodes of the present invention can be 300 dpi or more in size.

Figure 4:
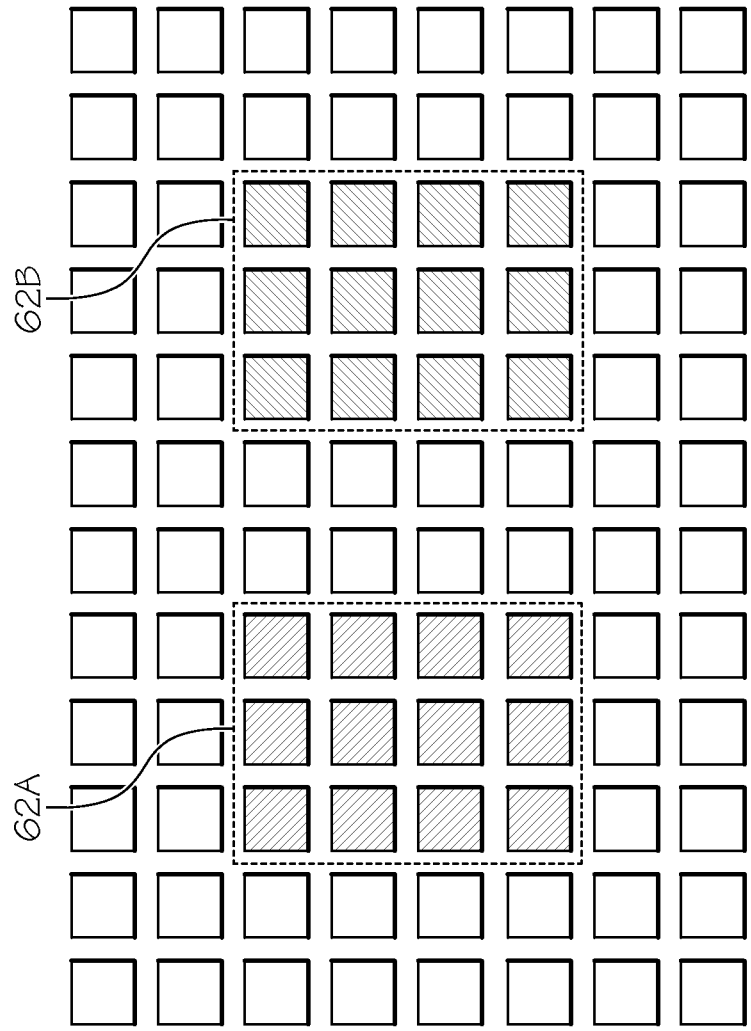
FIG. 4 depicts a finger detection area according to an embodiment of the present invention.

Referring now to FIG. 4, a diagram depicting large area finger detection according to an embodiment of the present invention is shown. As depicted, imaging pixel electrodes 60 (shown in a column-tow matrix) can be grouped into one or more groups or nodes 62A-B. This will allow a more accurate and economical detection of a finger. After finger detection each node 62A-B can perform fingerprint pattern scanning.

Figure 5:
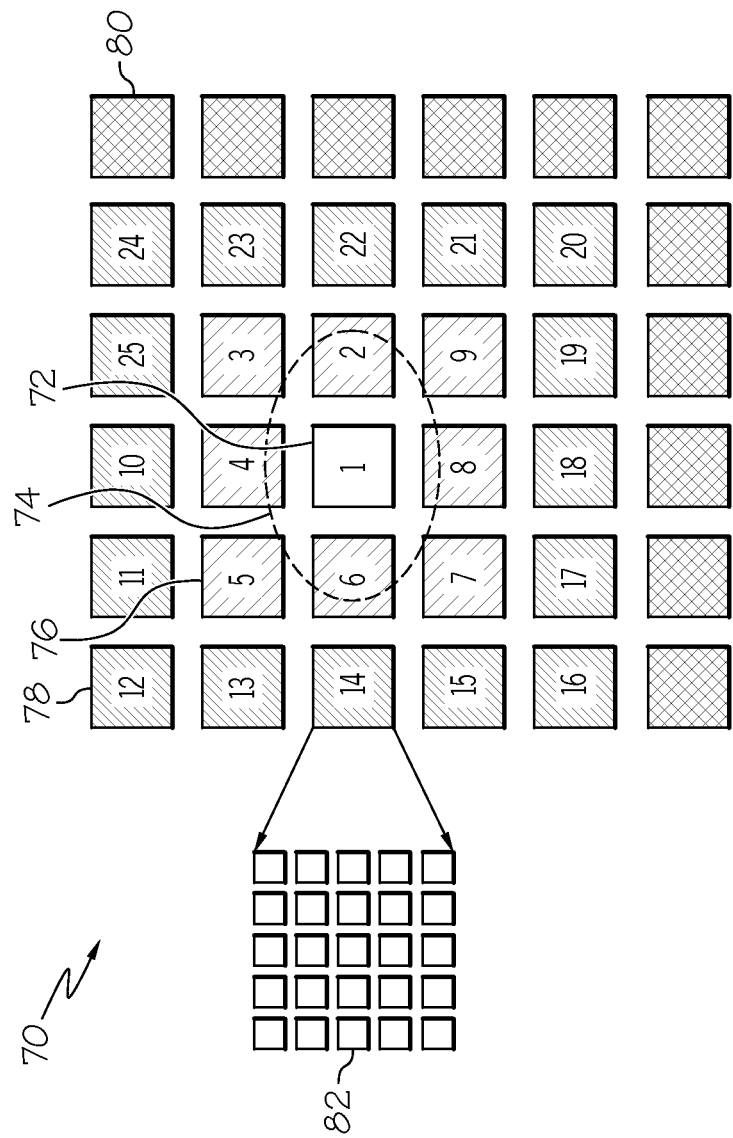
FIG. 5 depicts a diagram of adaptive finger locating detection according to an embodiment of the present invention.

Referring now to FIG. 5, a diagram depicting adaptive finger location detection according to an embodiment of the present invention is shown. Specifically, FIG. 5 depicts one of the nodes of FIG. 4. In general, adaptive finger location is detected using two groups of commonly connected nodes. Along these lines, a group/node is typically comprised of 5×5 sensors/ports/imaging pixel electrodes 82, although this can be varied (e.g., 6×6, etc.). In a typical embodiment, a voltage is applied to group/node 1, and resistance and/or voltage is measured on surrounding groups/nodes. Using the rough scanning of 5×5 sensor arrays, nine groups/nodes 74 and 76 (e.g., numbers 1-9) of matrix 70 are generally found useful and other groups/nodes 78 and 80 (10-25 and the un-numbered groups) can be ignored for fingerprint scanning. Specifically, the following algorithm can be implemented hereunder for adaptive finger location detection:

$$5\times5 \text{ sensors (to a single node)}=25 \text{ sensors}$$

Then the fingerprint scanning that follows can be represented by:

$$3\times3 \text{ nodes}\times5\times5 \text{ sensors}=225 \text{ sensors}$$

Thus, the saved scanning time can be represented as follows:

$$(5\times5\times6\times6)-5\times5-(3\times3\times5\times5)=900-25-225=650$$

$$650/900=72\% \text{ scanning saved by finger detection}$$

Figure 6:
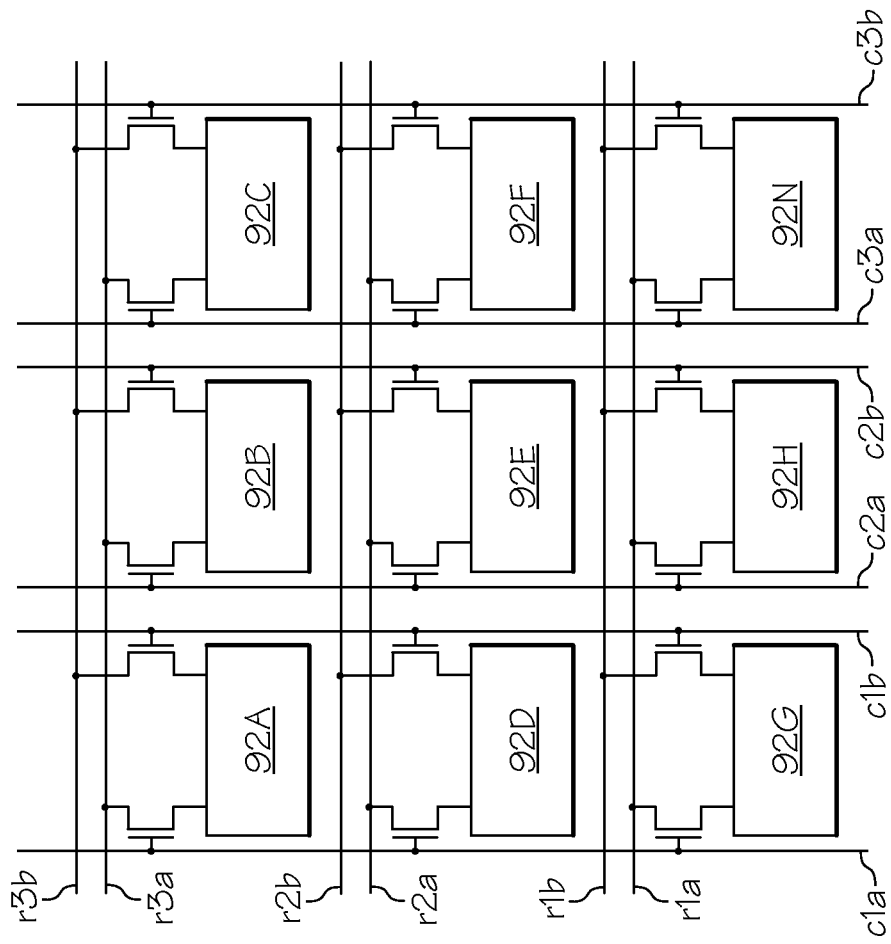
FIG. 6 depicts a diagram of a two-way electrical sensing array according to an embodiment of the present invention.

Referring now to FIG. 6, an electrical sensing array 90 according to an embodiment of the present invention is shown. As shown, array 90 comprises nodes 92A-N. In general, each electric sensing node can be accessed by two independent electrical accesses. As such, two nodes can be accessed independently for electrical sensing.

Figure 7:
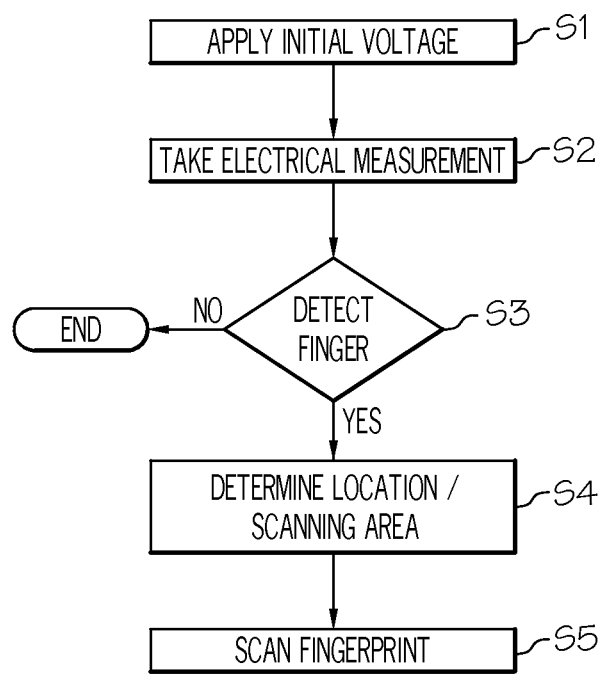
FIG. 7 depicts a method flow diagram according to an embodiment of the present invention.

Referring now to FIG. 7, a method flow diagram according to an embodiment of the present invention is shown. In step S1, an initial voltage is applied to a first imaging pixel electrode, the first imaging pixel electrode being in contact with a first portion of a finger. In step S2, an electrical measurement is determined across the first imaging pixel electrode and a second imaging pixel electrode in response to the applying of the initial voltage. As shown above, the second imaging pixel electrode is in contact with the second portion of a finger. In step S3, it is determined, based on the electrical measurement, whether a finger is detected. If not, the process can end. If a finger is detected, a location of finger on the scanning device is determined based on the electrical measurement in step S4. Then, in step S5, a fingerprint is scanned/obtained from the finger at the determined location.

Figure 8:
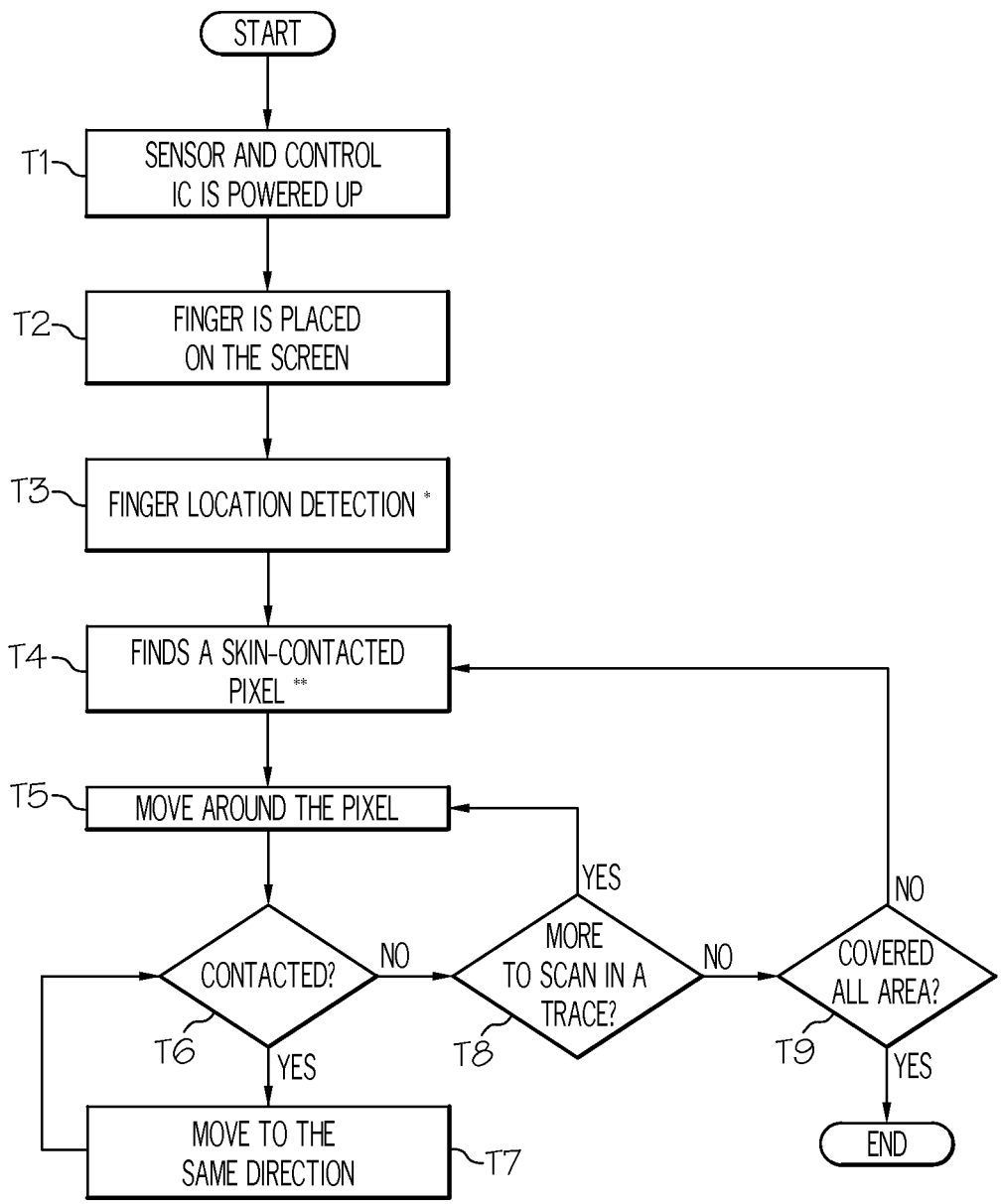
FIG. 8 depicts a method flow diagram according to an embodiment of the present invention.

Referring now to FIG. 8, a more detailed diagram of an adaptive fingerprint scanning process is shown. As depicted, in step T1, a sensor and a control integrated circuit (IC) is powered-up. In step T2, a finger is placed on a screen/scanning surface. In step T3, finger location detection occurs. In step T4, a skin-contacted imaging pixel electrode is found. In step T5, movement around the pixel occurs. In step T6, it is determined whether contact is made. If so, movement is repeated in the same direction in step T7. If no contact was made, it is determined in step T8 whether there is more to scan in a trace. If so, the process returns to step T5. If not, it is determined in step T9 whether all areas have been covered. If not, the process returns to step T4.

Figure 9:
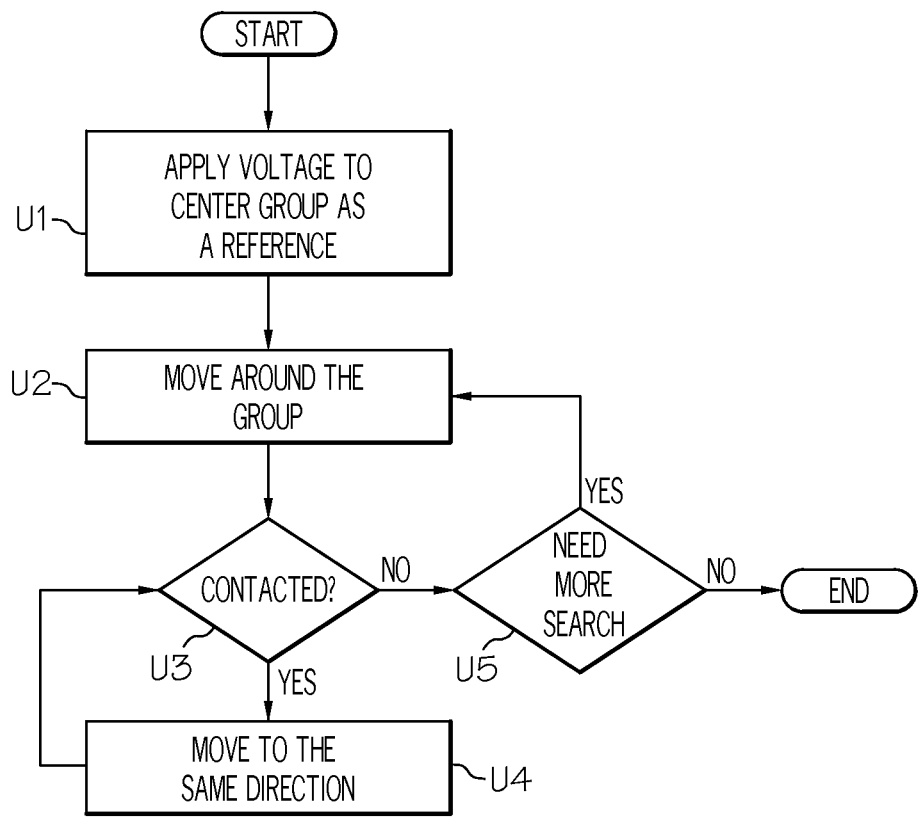
FIG. 9 depicts a method flow diagram according to an embodiment of the present invention.

Referring now to FIG. 9, the finger location detection process of step T3 of FIG. 8 is shown in greater detail. In step U1, a voltage is applied to a center group as a reference. In step U2, movement (e.g., voltage movement) around the group is applied. In step U3, it is determined whether contact was made. If so, movement in the same direction is made in step U4. If not, it is determined if additional searching is needed in step U5. If so, the process returns to step U2.

Figure 10:
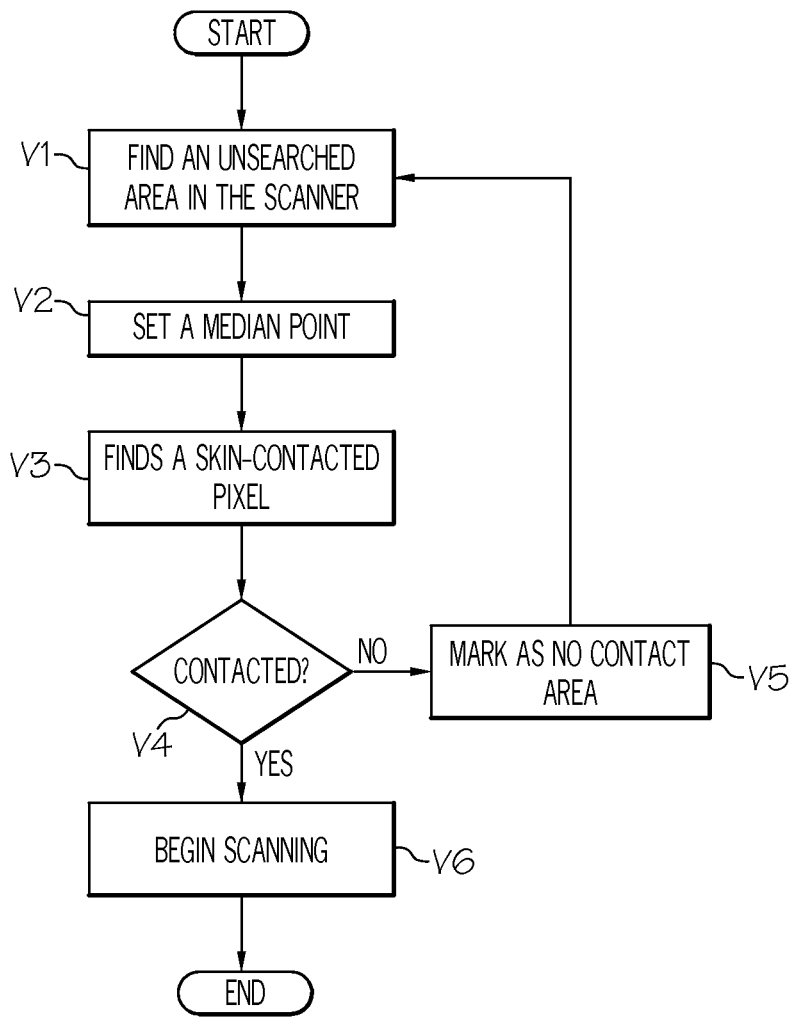
FIG. 10 depicts a method flow diagram according to an embodiment of the present invention.

Referring now to FIG. 10, the contacted-pixel search for a pattern scan process of step T4 of FIG. 8 is shown. As depicted, an unsearched area in the fingerprint scanner is detected in step V1. In step V2, a median point is set. In step V3, a skin-contacted pixel is found. In step V4, it is determined whether contact has been made. If not, the corresponding area of the scanner can be marked as a "no contact area" in step V5. IF contact was made, the actual finger print scanning can be commenced in step V6.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method of scanning fingerprints, comprising:
applying an initial voltage to a first imaging pixel electrode within a plurality of substantially similar imaging pixel electrodes, the first imaging pixel electrode being in contact with a first portion of a finger;
determining an electrical measurement across the first imaging pixel electrode and a second imaging pixel electrode within the plurality in response to the applying of the initial voltage, the second imaging pixel electrode being in contact with a second portion of a finger;
detecting, based on the electrical measurement, at least two of a set of locations of a scanning surface on which portions of a finger are placed;
determining a zone between the at least two locations of the set of locations, the zone representing an area between two portions on a finger where the finger was undetected; and
optical scanning only the set of locations and the zone for a fingerprint from the finger,
wherein the first imaging pixel electrode and the second imaging pixel electrode are among a plurality of imaging pixel ports of a device for carrying out the method and wherein the first imaging pixel electrode and the second imaging pixel electrode are non-adjacent to one another among the plurality of imaging pixel ports.

2. The method of claim 1, the determining comprising determining a resistance across the first portion and the second portion in response to the applying of the initial voltage to the first imaging pixel electrode.

3. The method of claim 2, the initial voltage being applied via a voltage source coupled to the first imaging pixel electrode, and the resistance being determined via a meter coupled to the first imaging pixel electrode.

4. The method of claim 1, the determining comprising determining a charged skin voltage across the first portion and the second portion in response to the applying of the initial voltage to the first imaging pixel electrode.

5. The method of claim 4, the initial voltage being applied via a voltage source coupled to the first imaging pixel electrode, and the charged skin voltage being determined via a meter coupled to the second imaging pixel electrode.

6. A method of scanning fingerprints, comprising:
applying an initial voltage to a first imaging pixel electrode within a plurality of substantially similar imaging pixel electrodes, the first imaging pixel electrode being in contact with a first portion of a finger;
determining an electrical measurement across the first imaging pixel electrode and a second imaging pixel electrode within the plurality in response to the applying of the initial voltage, the second imaging pixel electrode being in contact with a second portion of a finger, and the second imaging pixel electrode being non-adjacent to the first imaging pixel electrode;
determining at least two of a set of locations of portions of a finger on a scanning device based on the electrical measurement;
determining a zone between the at least two locations of the set of locations, the zone representing an area between two portions on a finger where the finger was undetected; and
optical scanning the zone and a fingerprint from the finger only at the set of locations.

7. The method of claim 6, the determining comprising determining a resistance across the first portion and the second portion in response to the applying of the initial voltage to the first imaging pixel electrode.

8. The method of claim 7, the initial voltage being applied via a voltage source coupled to the first imaging pixel electrode, and the resistance being determined via a meter coupled to the first imaging pixel electrode.

9. The method of claim 6, the determining comprising determining a charged skin voltage across the first portion and the second portion in response to the applying of the initial voltage to the first imaging pixel electrode.

10. The method of claim 9, the initial voltage being applied via a voltage source coupled to the first imaging pixel electrode, and the charged skin voltage being determined via a meter coupled to the second imaging pixel electrode.

11. The method of claim 6, the first imaging pixel electrode and the second imaging pixel electrode being among a plurality of imaging pixel ports of a device for carrying out the method.

12. A device for scanning fingerprints, comprising:
a plurality of substantially similar imaging pixel electrodes for creating a fingerprint scanning surface;
a voltage source coupled to the set of imaging pixel electrodes for supplying an initial voltage;
a meter coupled to the set of imaging pixel electrodes for taking an electrical measurement across a first imaging pixel electrode and a second imaging pixel electrode of the set of imaging pixel electrodes, wherein the first imaging pixel electrode and second imaging pixel electrode are within the plurality of substantially similar imaging pixel electrodes; and
a fingerprint scanner configured to optically scan only;
a set of locations where it is determined that portions of a finger are placed based on the electrical measurement; and
a zone between at least two locations of the set of locations, the zone representing an area between two portions on a finger where the finger was undetected,
wherein the first imaging pixel electrode and the second imaging pixel electrode are among a plurality of imaging pixel ports of the device and wherein the first imaging pixel electrode and the second imaging pixel electrode are non-adjacent to one another among the plurality of imaging pixel ports.

13. The device of claim 12, the meter being configured to take the electrical measurement across a first portion of a finger contacting the first imaging pixel electrode and a second portion of the finger contacting the second imaging pixel electrode.

14. The device of claim 13, the electrical measurement comprising a resistance across the first portion and the second portion that is taken by the meter in response to the applying of the initial voltage to the first imaging pixel electrode.

15. The device of claim 14, the voltage source and the meter being coupled to the first imaging pixel electrode.

16. The device of claim 12, the electrical measurement comprising a charged skin voltage across the first portion and the second portion that is taken by the meter in response to the applying of the initial voltage to the first imaging pixel electrode.

17. The device of claim 16, the voltage source being coupled to the first imaging pixel electrode, and the meter being coupled to the second imaging pixel electrode.

* * * * *